(12) United States Patent
Sperry et al.

(10) Patent No.: US 7,323,665 B2
(45) Date of Patent: Jan. 29, 2008

(54) HEATING ELEMENT FOR HIGH-SPEED FILM-SEALING APPARATUS, AND METHOD FOR MAKING SAME

(75) Inventors: Charles R. Sperry, Northampton, MA (US); Suzanne M. Scott, Springfield, VT (US); Jason A. Rittenhour, Claremont, NH (US); Jack Crane, Woodbridge, CT (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 96 days.

(21) Appl. No.: 11/399,038

(22) Filed: Apr. 6, 2006

(65) Prior Publication Data

US 2007/0235443 A1    Oct. 11, 2007

(51) Int. Cl.
*H05B 3/34* (2006.01)
*B65B 51/10* (2006.01)

(52) U.S. Cl. .................. 219/549; 219/244; 219/243; 219/256; 53/568; 53/329.2; 53/374.4; 53/374.2; 53/374.3; 53/375.4; 53/371.2; 53/371.4; 156/459; 100/328

(58) Field of Classification Search ............ 219/244–3, 219/256, 549; 53/568, 329.2, 374.4, 374.2, 53/374.3, 375.4, 371.2, 371.4; 156/459; 100/328

See application file for complete search history.

(56) References Cited

U.S. PATENT DOCUMENTS 6,550,229 B2    4/2003    Sperry et al.
6,554,854 B1    4/2003    Flanagan
6,598,373 B2    7/2003    Sperry et al.
6,984,804 B2    1/2006    Takeyama et al.

FOREIGN PATENT DOCUMENTS

JP    56047285    4/1981
JP    10137957    5/1998

OTHER PUBLICATIONS

Lap Weld, Jan. 17, 2006 www.lasers.org.uk/laser_welding/lapweld.htm.
Leonard Migliore; Welding with Lasers; Reprint from Industrial Laser Review; Jul. 1998 www.laserk.com/newsletters/paperwelding.html.

*Primary Examiner*—Shawntina Fuqua
(74) *Attorney, Agent, or Firm*—Alston & Bird LLP

(57) ABSTRACT

A heating element for a film-sealing apparatus comprises a heating wire segment formed of a first metal having a first reflectance to laser radiation of a predetermined wavelength. The heating element further comprises a first conductor lead comprising a wire having one end joined to a first end of the heating wire segment, and a second conductor lead comprising a wire having one end joined to a second end of the heating wire segment. The first and second conductor leads have a lower electrical resistance than the heating wire segment, and are formed of a second metal having a second reflectance to laser radiation of the predetermined wavelength, the second reflectance being higher than the first reflectance. Each of the first and second conductor leads is lap-welded to the respective end of the heating wire segment using laser radiation of the predetermined wavelength.

19 Claims, 2 Drawing Sheets

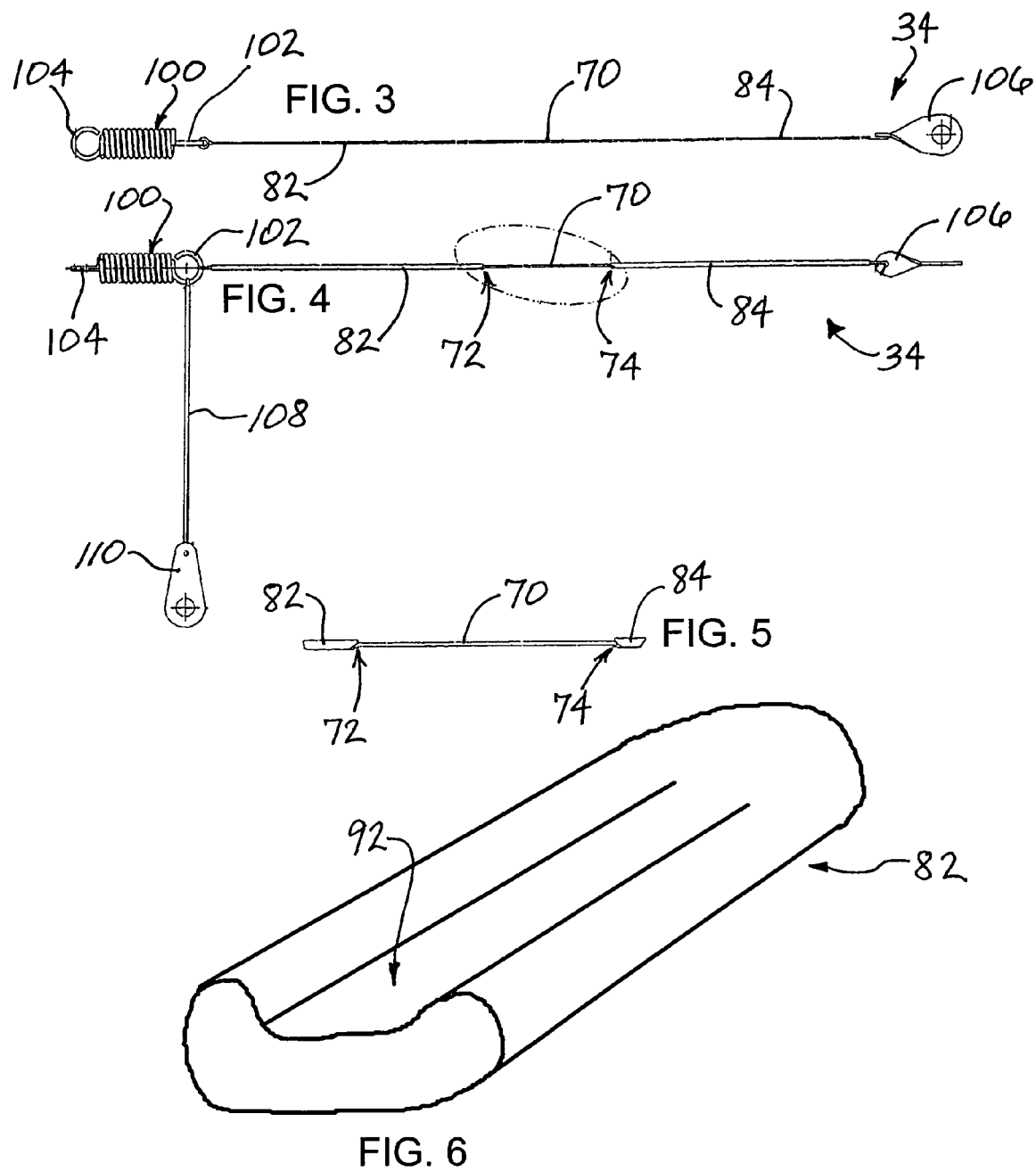

HEATING ELEMENT FOR HIGH-SPEED FILM-SEALING APPARATUS, AND METHOD FOR MAKING SAME

BACKGROUND OF THE INVENTION

The present invention relates to the heat-sealing of polymer films in general, and more particularly relates to a heating element for a film-sealing apparatus, and to a method for making such a heating element.

Conventional devices for making longitudinal heat seals in polymer film material generally include a sealing wire or other electrical heating means wrapped around and affixed to the circumference of a rotatable cylinder such that the wire rotates along with the cylinder. To effect a heat seal, the entire wire is heated, by sending an electrical current therethrough, and the cylinder is brought into rotational contact with the film plies to be sealed as the film plies move against and past the heated cylinder. While this approach has generally been effective, its main drawback is that consistent sealing temperatures are difficult to achieve.

Such inconsistent sealing temperatures are due to two primary factors: first, the entire wire is heated and, second, the wire is wrapped about the entire circumference of the rotatable cylinder. During continuous operation of the apparatus, this configuration results in a gradual but steady increase in the temperature of the cylinder because the cylinder continually absorbs heat from the wire at a faster rate than the rate at which the heat can be dissipated to the air. Without careful control and monitoring of the longitudinal heat-seal device, the ever-changing temperature of the rotating cylinder often results in inconsistent seals being made between the film plies. As a consequence, insufficient heat necessary to form complete (strong) heat-seals may be applied at the beginning of a session, and/or an excessive amount of heat may be applied toward the end of the session, which causes the cylinder to melt through the film plies and produce holes in the film. When the heat-seal device melts through the film plies, an outer strip from one or both film plies very often separates from the rest of the film and wraps around the longitudinal heat-seal device. This results in the necessity of shutting down the apparatus and extricating the film strip from the heat-seal device. Typically, the strip is tightly wound around the device and/or partially melted such that removal of the strip is a difficult and time-consuming process.

Another drawback of the "wrap-around" type of heat-seal device as discussed above is that routine maintenance procedures are more cumbersome and time-consuming than would otherwise be desired. In particular, the sealing wire is difficult to remove and replace when worn.

Finally, since the entire wire must be heated, the energy requirements for the sealing device are higher than desired.

The above problems have been addressed in U.S. Pat. No. 6,550,229, assigned to the assignee of the present application and incorporated herein by reference in its entirety. The '229 patent discloses a device for sealing two plies of plastic film together, comprising an electrically conductive heating element having a first end secured to a first node and a second end secured to a second node, and a rotatable support cylinder having an outer circumferential surface, the cylinder being positioned in abutting relationship with the heating element and capable of rotating against the heating element along a predetermined contact arc such that less than a complete circumference of the outer surface of the cylinder is in contact with the heating element. Accordingly, two juxtaposed plies of plastic film may be sealed together by bringing the juxtaposed film plies into contact with the heating element along the contact arc and causing sufficient current to flow through the heating element that the heating element heats to a sealing temperature that causes the juxtaposed film plies to seal together.

The heating element in one embodiment disclosed in the '229 patent has a relatively short heating wire segment of nickel-chromium alloy having a relatively high electrical resistance. One end of the heating wire segment is butt-welded to a stainless steel conductor lead, and the opposite end of the heating wire segment is butt-welded to another stainless steel conductor lead. The conductor leads have lower electrical resistance than the heating wire segment, such that the heating wire segment heats to a higher temperature than the conductor leads for a given amount of current flowing through the heating element. The heating wire segment is in contact with the rotatable support cylinder along the contact arc, such that the juxtaposed film plies are contacted by the heating wire segment. By suitably regulating the current, the heating wire segment heats to the sealing temperature while the conductor leads remain below the sealing temperature. In this manner, undesired melting of the film plies by the conductor leads is avoided.

The sealing device disclosed in the '229 patent represented a significant advance over the then-existing state of the art. Nevertheless, further improvement is sought. In particular, it is desired to increase the linear advance rate of the juxtaposed film plies being sealed together.

BRIEF SUMMARY OF THE INVENTION

The present invention is addressed to the above-noted needs and desires. When increasing the speed of the film plies, it is necessary to increase the power input to the heating element. However, at such higher power input, the stainless steel conductor leads of the heating element of the '229 patent begin to heat to a high enough temperature to cause operational problems with the sealing device. Such operational problems can include "ribbon cutting" of the film plies by the conductor leads. Additionally, areas of the conductor leads that are not in contact with either the film plies or the support cylinder, and thus are not able to conduct away excess heat, can experience mechanical failure as a result of overheating.

To reduce the problems caused by excessive temperature of the conductor leads, the electrical resistance of the conductor leads can be reduced. One way to accomplish this is to make the conductor leads from a metal of higher electrical conductivity. For example, in one embodiment the conductor leads can be formed of copper. However, copper and the nickel-chromium alloy of the heating wire segment are sufficiently different in properties that difficulties are encountered in welding the conductor leads to the heating wire segment.

In accordance with one embodiment of the invention, a heating element for a film-sealing apparatus comprises a heating wire segment having opposite first and second ends, the heating wire segment being formed of a first metal having a first reflectance to laser radiation of a predetermined wavelength, the heating wire segment having a first electrical resistance. The heating element further comprises a first conductor lead comprising a wire having one end joined to the first end of the heating wire segment and an opposite end for connection to an electrical current supply, and a second conductor lead comprising a wire having one end joined to the second end of the heating wire segment and an opposite end for connection to the electrical current supply. The first and second conductor leads each has an electrical resistance lower than the first electrical resistance of the heating wire segment, and is formed of a second metal having a second reflectance to laser radiation of the predetermined wavelength, the second reflectance being higher than the first reflectance. Each of the first and second conductor leads is lap-welded to the respective end of the heating wire segment using laser radiation of the predetermined wavelength.

In one embodiment, the one end of each conductor lead is prepared for the laser lap-welding step by deforming the end to form a concave recess in the outer surface of the conductor lead for receiving a respective end portion of the heating wire segment. The end portions of the heating wire segment are cradled in the recesses of the conductor leads to form lap joints, and the laser radiation is focused on each of the lap joints to cause the material of the heating wire segment to melt. The recess contains the molten material until the material of the conductor lead also melts, and the two materials flow together and bond upon cooling.

In one embodiment, the first metal of the heating wire segment comprises a nickel-chromium alloy and the second metal of the conductor leads comprises copper. The second metal can comprise a copper alloy such as a copper-nickel alloy. For example, the second metal can comprise a copper alloy containing about 2% nickel by weight.

The heating element in accordance with one embodiment of the invention includes a tension spring connected to one of the first and second conductor leads for exerting a tension force on the heating element during use. The heating element can further comprise a shunt wire connected from one end of the tension spring to an opposite end of the tension spring such that some of the electrical current flowing through the heating element passes through the shunt wire, bypassing the tension spring. This reduces the overall resistance of the heating element, thereby lowering the power consumption of the heating element. The use of the shunt wire also reduces the heating of the tension spring and thus alleviates problems such as high temperature-induced reduction of the spring constant.

A method for making a heating element for a film-sealing apparatus in accordance with one embodiment of the invention comprises the steps of:

providing a heating wire segment formed of a first metal having a first reflectance to laser radiation of a predetermined wavelength, the heating wire segment having a first electrical resistance and having opposite first and second ends;

providing first and second conductor leads each formed of a second metal having a second reflectance to laser radiation of said predetermined wavelength, the second reflectance being higher than the first reflectance, each of the conductor leads having an electrical resistance lower than the first electrical resistance of the heating wire segment; and lap-welding one end of the first conductor lead to the first end of the heating wire segment, and lap-welding one end of the second conductor lead to the second end of the heating wire segment, using laser radiation of said predetermined wavelength.

The method in accordance with a further embodiment of the invention comprises the steps of:

deforming the one end of each of the first and second conductor leads to form a concave recess in an outer surface of the conductor lead, the concave recess extending lengthwise along the conductor lead;

cradling the first and second ends of the heating wire segment in the concave recesses of the respective first and second conductor leads to form a lap joint between the heating wire segment and each of the conductor leads; and focusing the laser radiation on each of the lap joints to weld the first and second conductor leads to the heating wire segment.

Each conductor lead initially can be provided as a circular wire, and the deforming step can comprise deforming the one end of each of the first and second conductor leads to have a generally kidney-shaped cross-section.

In a further embodiment, after the lap-welding steps, portions of the heating element are deformed to have a generally flattened cross-section.

The method can also include the step of joining a mounting lug to the opposite end of one of the first and second conductor leads for mounting one end of the heating element to a support and for establishing an electrical connection with an electrical current supply. The opposite end of the other conductor lead can be connected to a tension spring as previously described, for maintaining tension in the heating element during use.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 is a side elevation of a heating element for a sealing device, in accordance with one embodiment of the invention;

FIG. 4 is a top elevation of the heating element;

FIG. 5 is a magnified view of a portion of FIG. 4; and

FIG. 6 is a diagrammatic depiction of the end of one of the conductor leads of the heating element, shown greatly magnified, the end having been deformed to form a concave recess for cradling an end of the heating wire segment in preparation for laser lap-welding.

DETAILED DESCRIPTION OF THE INVENTION

The present inventions now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides an improved heating element for a film-sealing device. Such sealing devices can be used in various applications, as exemplified by U.S. Pat. No. 6,550,229 and U.S. Pat. No. 6,598,373, the disclosures of which are incorporated herein by reference. The film sealing device described herein can also be used in the production inflatable air-cellular cushioning material designed to be inflated and sealed at the point of use. These applications are given only by way of example, the invention being suitable for many types of applications entailing the sealing of thermoplastic films.

Figure 1:
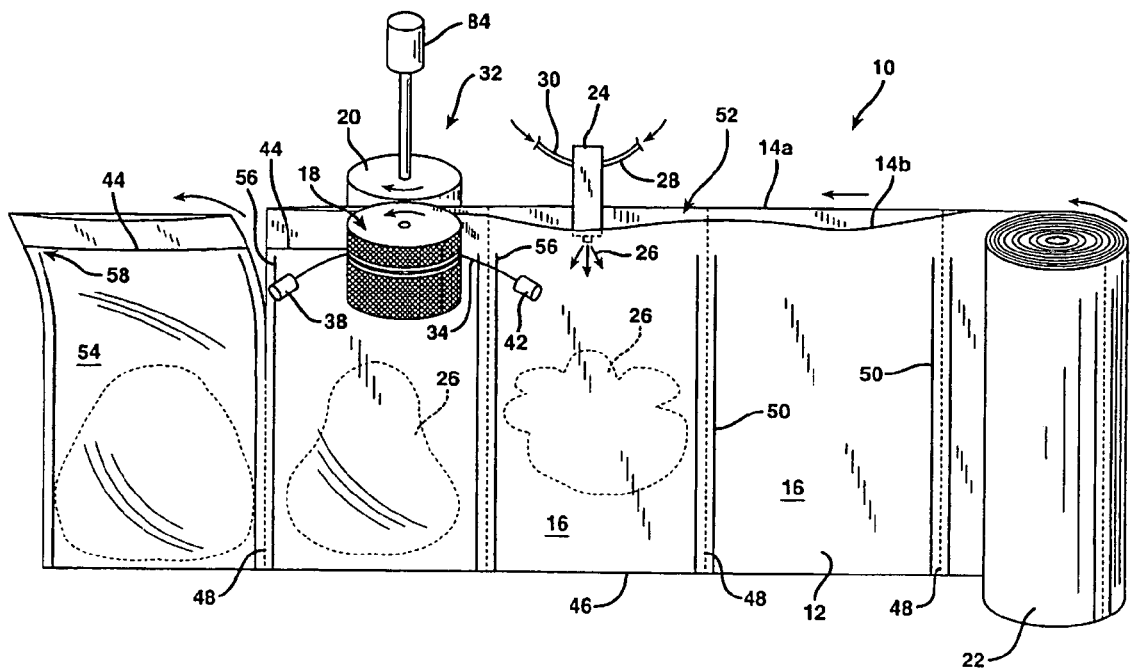
FIG. 1 is a schematic illustration of an apparatus for making foam-in-bag cushions, including a sealing device in accordance with one embodiment of the invention.

One such application is the production of foam-in-place cushions or other fluid-filled flexible containers. FIG. 1 schematically illustrates an apparatus 10 for dispensing fluid into flexible containers and enclosing the fluid within the containers. Also illustrated is a web of film 12 comprising two juxtaposed plies 14a and 14b of plastic film that define partially formed flexible containers 16. The film web may comprise any flexible material that can be manipulated by apparatus 10 as herein described, including various thermoplastic or fibrous materials, e.g., polyethylene homopolymer or copolymer, polypropylene homopolymer or copolymer, paper, etc.

Apparatus 10 includes a mechanism that conveys the film web 12 along a predetermined path of travel. Such conveying mechanism may include a pair of counter-rotating cylinders 18 and 20 that pull the film web 12 through apparatus 10 along a predetermined travel path, and also a device (not shown) to position and support a storage roll 22 from which film web 12 may be advanced. The "travel path" of film web 12 simply refers to the route that the film web traverses while being conveyed through the apparatus 10, as indicated by the shape assumed by the film web due to the manipulation thereof by apparatus 10. As will be appreciated, the particular conveying mechanism components and travel path selected are not critical to the practice of the present invention, and various other conveying mechanism components and travel-path configurations may be employed as desired, including additional cylinders or rollers such as guide rollers, e.g., to provide a more elaborate travel path in order to reduce the footprint of the apparatus.

Apparatus 10 further includes a dispenser 24 through which a fluid 26 may flow in predetermined amounts, the dispenser being in fluid communication with a fluid source (not shown) containing therein fluid 26. Dispenser 24 is positioned adjacent to or in the travel path of film web 12 such that the dispenser can dispense the fluid 26 into the partially formed container 16 as shown. Any desired fluid may be dispensed into the containers in accordance with the present invention, including gaseous fluids such as air in order to make inflated air cushions for packaging and other applications; pumpable foods such as soups, sauces, and condiments; flowable foods such as shredded cheese; industrial liquids such as detergents, chemical solutions, etc.; medical fluids such as saline solutions; and foamable compositions for foam-in-place packaging.

The apparatus 10 as presently illustrated is particularly well suited for the latter application, i.e., for making foam-in-place cushions. Thus, fluid 26 is preferably selected from polyols, isocyanates, and mixtures of polyols and isocyanates. For example, one or more polyols may be supplied from a fluid source (not shown) to dispenser 24 via supply line 28, while one or more isocyanates may be supplied from a second fluid source (not shown) to dispenser 24 via supply line 30. Suitable fluid sources for the polyol(s) and isocyanate(s) may include a separate drum or other container for each chemical. The polyol(s) and isocyanate(s) may flow through respective supply lines 28, 30 by action of separate pumps (not shown) that are in fluid communication with both the fluid source and supply lines 28, 30. Alternatively, the fluid sources may be positioned above dispenser 24 so that the polyol(s) and isocyanate(s) flow through the supply lines 28, 30 by force of gravity.

Dispenser 24 receives and mixes the polyol(s) and isocyanate(s) and dispenses the resultant mixture of fluids, indicated at 26, into the partially formed containers 16. As explained in the background section hereinabove, the polyol(s) and isocyanate(s) are foam precursors which, when mixed, produce a foamable composition that reacts to form a polyurethane foam. Polyurethane foam is thus injected into each container 16. The amount of such foamable fluid to be dispensed into each container 16 by dispenser 24 is predetermined, based on, e.g., the internal volume within the container, the degree to which the fluid expands as it forms into a foam, the amount of foam that is desired to be contained in each completed container/packaging cushion, etc. Such determination of the predetermined amount of fluid to be dispensed by dispenser 24 is readily and commonly made by those having ordinary skill in the art to which this invention pertains.

As the foam expands in each container, it may be placed in a mold to produce a packaging cushion having a predefined shape as disclosed, e.g., in commonly assigned U.S. Pat. No. 5,776,510. Alternatively, container 16 with the expanding fluid (foamable composition) 26 therein may be placed against a product to be packaged and further placed in a box or other shipping vessel to form an individualized packaging cushion for such product.

Suitable dispensers of the type illustrated at 24 are well known and are disclosed, e.g., in commonly assigned U.S. Pat. Nos. 4,898,327 and 5,255,847, the disclosures of each of the foregoing are hereby incorporated herein by reference. Other suitable dispensers, albeit in the form of a hand-held mixing gun, are disclosed in commonly assigned U.S. Pat. Nos. 3,687,370, 3,945,569, and 4,426,023, the disclosures of which are also hereby incorporated herein by reference.

As an alternative to a dispenser as described above that mixes the polyol(s) and isocyanate(s) before dispensing the resultant mixture into the container, a dispenser of the type disclosed in commonly-owned U.S. Pat. No. 5,727,370 may be used. The disclosure of U.S. Pat. No. 5,727,370 is hereby incorporated herein by reference. Such a dispenser as disclosed in the '370 patent injects the polyol(s) and isocyanate(s) into the container through separate discharge nozzles such that the two foam precursors do not begin to mix and form foam until after being introduced into the container.

A further component of apparatus 10 is a device 32 for sealing the plies 14a, b of plastic film 12 together to enclose the fluid 26 within containers 16. Sealing device 32, which is illustrated in more detail in FIGS. 2-4, includes an electrically conductive heating element 34 having a first end 36 secured to a first node 38 and a second end 40 secured to a second node 42. Sealing device 32 produces a longitudinal heat-seal 44 between film plies 14a, b to seal the two plies together. The heat-seal 44 is produced by causing sufficient electrical current to flow through heating element 34 that it heats to a predetermined sealing temperature. Such sealing temperature is, in turn, sufficient to cause the juxtaposed film plies 14a, b to seal together by temporarily becoming fully or partially molten in the area of contact with the heating element 34.

In order to avoid melting through the film plies and to minimize the amount of electrical energy required to effect heat-seal 44, heating element 34 is generally formed from a thin and flexible material, e.g., a wire or the like, and is therefore somewhat fragile. Thus, it is preferable to position rotatable cylinder 18 in abutting relationship with heating element 34 to support the heating element and retain it in the proper position to form heat-seal 44.

When apparatus 10, including dispenser 24 and sealing device 32, is combined with a film web 12 as shown and one or more fluid sources in communication with dispenser 24, such combination is deemed herein to be a "system" for dispensing fluid into flexible containers and enclosing the fluid within the containers.

Film web 12 may be a single, C-folded film with a center fold 46 disposed along the longitudinal center of the film web and the folded halves of the film forming the two juxtaposed film plies 14a, b. By virtue of being juxtaposed in apparatus 10, the film plies 14a, b provide a partially formed flexible container into which fluid 26 is dispensed by dispenser 24 prior to being completed by sealing device 32 and, optionally, other sealing devices that may also be included. In the apparatus 10 as shown, sealing device 32 completes the containers 16 and thereby fully encloses fluid 26 therein. The longitudinal heat-seal 44 produced by sealing device 32 operates in cooperation with perforated, transverse seams 48 and transverse heat-seals 50, both of which partition film web 12 into a plurality of individual, partially-formed containers 16. The term "transverse" is used to denote the alignment of the perforations 48 and heat-seals 50, which are generally perpendicular to the longitudinal direction in which the film web 12 moves through apparatus 10. Such perforated seams 48 and pre-formed heat-seals 50 are not required in the apparatus and system of the present invention, and may be replaced if desired by the inclusion in apparatus 10 of more conventional transverse severing/sealing devices, such as those disclosed in the above-incorporated patents. When such transverse partitions 48, 50 are employed, they may be pre-formed in film web 12, i.e., by equipment that is separate from apparatus 10 prior to placing the film web in the apparatus as shown, or may be formed "in-situ", i.e., by appropriate equipment associated with apparatus 10 as the film web is unrolled from storage roll 22.

In either event, i.e., whether the transverse partitions 48, 50 are pre-formed or formed in-situ, sealing device 32 completes the partially formed containers 16 by forming longitudinal heat-seal 44. Each of the partially formed containers 16 have three closed edges as formed by a pair of transverse heat-seals 50 and the longitudinal center fold 46 as shown. The upper longitudinal edge 52 remains open and thereby allows dispenser 24 to inject fluid 26 into the containers 16 via the open edge 52, i.e., between film plies 14a, b. After fluid 26 is injected into a container 16, the entire film web 12 is indexed in the direction of the arrow (i.e., to the left as illustrated in FIG. 1) so that the container 16 that had just been injected with fluid 26 is sealed closed, i.e., the open longitudinal edge 52 of such container is sealed closed when sealing device 32 seals film plies 14a, b together via heat-seal 44. In this manner, a completed container 54 is formed, which may be separated from the rest of the film web 12 by tearing through the perforated seam 48 as shown once the completed container has been indexed beyond the sealing device 32.

When fluid 26 is a foamable composition, it may be desirable to space longitudinal heat-seal 44 from one or both of the upper ends 56 of transverse heat-seals 50 as shown. The resultant gap between the ends 56 of transverse heat-seals 50 and longitudinal heat-seal 44 provides vents 58, which allow excess gas generated by the foaming reaction to escape from the completed container 54. At the same time, since the vents 58 are located in the upper corners of the completed container 54, escape of the expanding foam from the container is unlikely. If a vent is not needed or desired, e.g., when fluid 26 is a liquid that does not produce gas or the fluid is a gas such as air that is intended to remain trapped inside the container 54 (i.e., to make an air cushion), the ends 56 of transverse heat-seals 50 may be extended toward the longitudinal edge 52 of film web 12 and/or longitudinal heat-seal 44 may be lowered such that the transverse heat-seals 50 intersect with the longitudinal heat-seal 44. In this manner, fluid 26 would be hermetically sealed within the finished container 54.

As an alternative to film web 12 having perforated transverse seams 48 and separate transverse heat-seals 50 as shown in FIG. 1, a simpler C-folded film web may be employed without such features as disclosed in the above-incorporated U.S. Pat. No. 6,003,288, in which a device for transversely sealing the film web and separating a completed container from the rest of the film web is positioned "downstream" of the longitudinal heat-seal device. The transverse sealing/separating device operates by pressing a heated wire against the film webs, wherein the wire is heated to a temperature sufficient to both seal and sever the film plies. This creates a final transverse seal to complete a container, severs the container from the rest of the film web, and forms a transverse seal for the next container to be injected with fluid. Instead of the wrap-around heat-seal device as disclosed in the '288 patent, a longitudinal seal opposite the folded longitudinal edge is made with sealing device 32 in accordance with the present invention and illustrated in FIG. 1.

As a further alternative, instead of using a single, C-folded film web, two separate, juxtaposed film plies may be employed as disclosed, e.g., in the above-incorporated U.S. Pat. No. 5,027,583. In such an embodiment, a pair of sealing devices 32 are used to create opposing longitudinal edge seals (in replacement of the more conventional wrap-around heat-seal devices as disclosed in those patents and described above), while a separate transverse severing/sealing device is employed as described immediately above to simultaneously form the final transverse seal to complete a container, sever the completed container from the rest of the film web, and form a transverse seal for the next container to be injected with fluid.

In both of the foregoing alternative embodiments, both film plies are juxtaposed while being conveyed through the apparatus of the present invention, and thereby constitute a partially formed container into which a fluid is dispensed. Depending on whether a single, C-folded film or two films are used, one or two sealing devices 32 form longitudinal heat-seals between the film plies so that individual containers can be completed to thereby enclose the fluid therein. Typically, the individual containers are continually formed at the same time that they are injected with fluid, with final closure occurring after a predetermined amount of fluid has been added. Unlike the system and apparatus shown in FIG. 2, the final closure for each container is not made by the longitudinal sealing device 32, but is instead made by a transverse severing/sealing device.

Film web 12, whether a single, C-folded film as shown or two separate films as discussed above, is preferably a flexible, thermoplastic film, and may be formed from any polymeric material capable of being formed into a flexible container as described herein. Non-limiting examples of suitable polymers include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very low density polyethylene (VLDPE), and ultra-low density polyethylene (ULDPE). Various other materials are also suitable such as, e.g., polypropylene homopolymer or polypropylene copolymer (e.g., propylene/ethylene copolymer), polyesters, polystyrenes, polyamides, polycarbonates, etc. The film(s) may be monolayer or multilayer films and can be made by any known coextrusion process by melting the component polymer(s) and extruding or coextruding them through one or more flat or annular dies.

Figure 2:
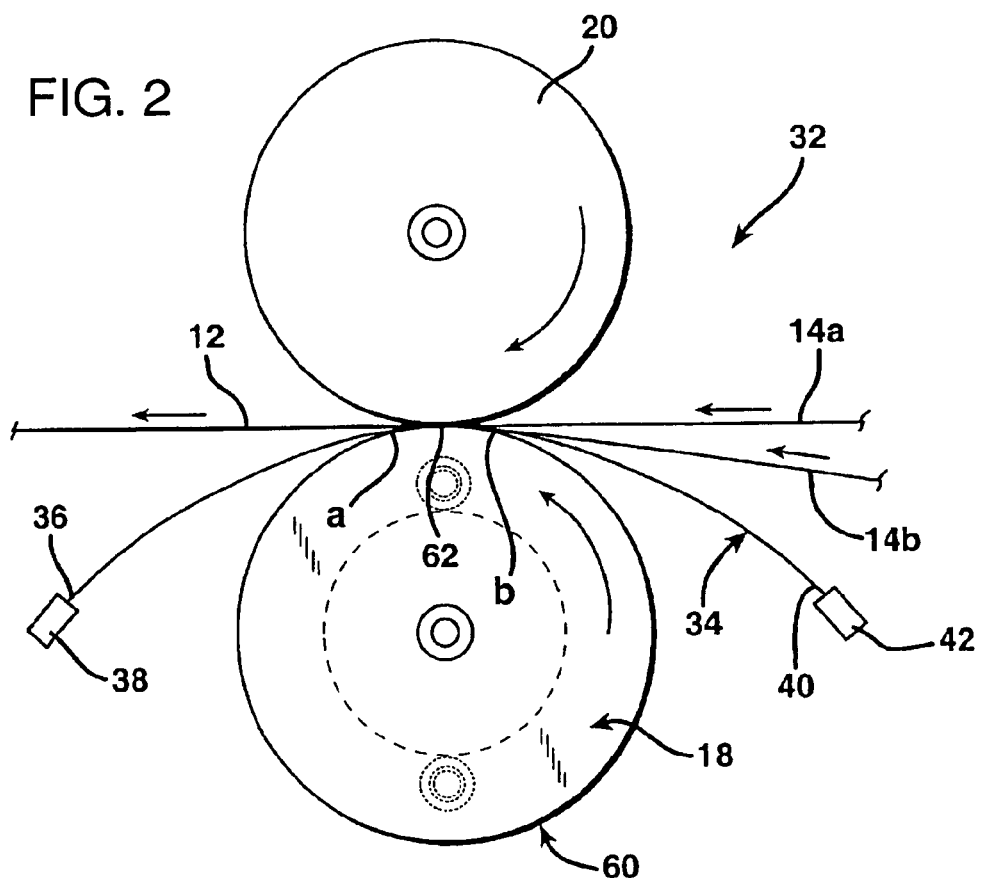
FIG. 2 is a schematic illustration of the sealing device in accordance with one embodiment of the invention.

Referring now to FIG. 2, sealing device 32 will be described in greater detail. Rotatable support cylinder 18 has an outer, circumferential surface 60 positioned in abutting relationship with the heating element 34, and is capable of rotating against the heating element along a predetermined contact arc 62 such that less than a complete circumference of the outer surface 60 of cylinder 18 is in contact with heating element 34. Contact arc 62 extends from point "a" to point "b" along the outer surface 60 of cylinder 18. The heating element 34 is secured at ends 36 and 40 by respective nodes 38 and 42 as the cylinder 18 rotates against the heating element. The two juxtaposed plies 14a, b of plastic film 12 are sealed together by bringing the juxtaposed film plies into contact with the heating element 34 along contact arc 62 and causing sufficient current to flow through the heating element that it heats to a sealing temperature sufficient to cause the film plies 14a, b to seal together.

By positioning the cylinder 18 such that only a portion of the circumference 60 is in contact with the heating element, a smaller amount of heat is transferred to the cylinder, relative to conventional sealing devices in which the heating element is wrapped about the entire circumference of the support cylinder, so the cylinder is much less likely to build up heat and thereby increase in temperature as the sealing device 32 is used in continuous operation. This, in turn, reduces the likelihood that the sealing device will burn through the film web 12. The contact arc 62 between the heating element 34 and cylinder 18 may be of any desired extent, e.g., ranging from about 1/30 to about 1/2 of the total circumference 60 of cylinder 18. More preferably, the contact arc 62 ranges from about 1/20 to about 1/3 of the circumference of cylinder 18 and, more preferably still, from about 1/10 to about 1/4 of the total circumference 60 of cylinder 18. For example, heating element 34 may be in contact with support cylinder 18 at a contact arc 62 that spans 1/16 of the total circumferential distance around the outer surface 60 of the cylinder, e.g., when the outer surface 60 of support cylinder 18 has a total circumference of 8 inches and the contact arc 62 spans a distance of 1.5 inches. Thus, in this example, only 1.5 inches of the 8 total inches of outer surface 60 are in contact at any one time with heating element 34.

The actual span of the contact arc 62 employed for a given application can be determined by those of ordinary skill in the art without undue experimentation, based primarily on the rate at which heat is transferred to the support cylinder 18 by the heating element 34 verses the rate at which heat can be dissipated from the cylinder 18. In general, the size of contact arc 62 is directly proportional to the amount of heat that is transferred from heating element 34 to cylinder 18. Another consideration in determining the span of contact arc 62 is the friction generated between the moving (rotating) cylinder 18 and non-moving heating element 34, with the size of contact arc 62 being directly proportional to the amount of such friction that is generated. Accordingly, it is generally preferred to minimize the size of contact arc 62 to the greatest extent possible, while at the same time allowing the sealing device 32 to perform its intended heat-sealing function in as flawless a manner as possible.

Cylinders 18 and 20 may form part of the conveying mechanism. This is not essential, however, as other means may be provided for conveying the film web 12 through the apparatus 10 and apparatus of the present invention, e.g., a separate pair of nip rollers that are not connected with the sealing device 32. However, for reasons of simplicity and economy, support cylinder 18 preferably forms part of the conveying mechanism along with the second cylinder 20. Second cylinder 20 is rotatable and is preferably positioned in abutting relationship with support cylinder 18 at contact arc 62 so that heating element 34 is positioned between and in contact with both cylinders at the contact arc. In addition to facilitating the conveyance of the film web 12 through the apparatus, this arrangement assists in making heat-seal 44 by both facilitating the movement of the juxtaposed film plies 14a, b past the heating element 34 and maintaining the film plies and heating element in proper position to make the heat-seal at a desired location along the films. Being in abutting relationship with cylinder 18 at contact arc 62, second cylinder 20 also facilitates the creation of heat-seal 44 by applying pressure to the juxtaposed film plies 14a, b at contact arc 62 and thereby forces the film plies against the heating element 34.

Preferably, the second cylinder 20 comprises a pliant material, such as, e.g., rubber or RTV silicone. Particularly when cylinders 18 and 20 form part of the conveying mechanism of apparatus 10, one or both cylinders are preferably coupled to a power source having a rotational output to cause the cylinders to rotate. As illustrated in FIG. 1, for example, second cylinder 20 may be axially coupled to a drive motor 84 which, when power (e.g., electricity) is supplied thereto, causes cylinder 20 to rotate. Since the cylinder 20 is positioned in abutting relationship with cylinder 18 as shown, the rotation of cylinder 20 causes cylinder 18 to rotate. Alternatively, motor 84 could be coupled instead to support cylinder 18 or, as a further alternative, separate drive motors could be coupled to both cylinders, e.g., to maintain a high degree of tension in the film web between cylinders 18, 20 and a second pair of drive cylinders.

Heating element 34 may be any device capable of heating to a predetermined temperature sufficient to heat-seal film the plies together. Such temperature, i.e., the "sealing temperature," may readily be determined by those of ordinary skill in the art without undue experimentation for a given application based on the composition and thickness of the film plies to be sealed, the speed at which the film plies move against the heating element, and the pressure at which the film plies and heating element are urged together by cylinders 18 and 20 at contact arc 62. As an example, when the sealing device 32 is used to manufacture foam-in-place, polyurethane foam cushions using polyethylene-based film ranging in thickness from about 0.5 to about 2 mils, the sealing temperature to which heating element 34 is heated may range from about 300 to about 500° F.

Suitable types of devices for heating element 34 include one or more wires comprising metal and/or other electrically conductive materials. When heating element 34 assumes such a form, the wire may have any desired cross-sectional shape, including round, square, oval, rectangular, etc. The actual shape to be employed in a given application, i.e., the cross-sectional shape that provides desired heat-sealing characteristics for such application, may be readily determined by those of ordinary skill in the art without undue experimentation, based on, for example, the thickness of the film plies to be sealed together, their composition, the speed at which they are driven past the sealing device 32, the pressure exerted against the film plies between the support cylinder 18 and second cylinder 20, etc.

Referring now to FIGS. 2-6, a heating element 34 in accordance with one embodiment of the invention will be described in greater detail. The heating element comprises a heating wire segment 70 having a first end 72 and an opposite second end 74. The first end 72 is laser lap-welded to a first conductor lead 82, and the second end 74 is laser lap-welded to a second conductor lead 84. The heating wire segment 70 comprises a metal having a relatively low electrical conductivity (i.e., relatively high resistance). A non-limiting example of a suitable metal for heating wire segment 70 is a nickel-chromium alloy (e.g., nichrome, comprising an alloy of about 80% nickel and about 20% chromium), or the like. The metal of the heating wire segment 70 has a relatively low reflectance to laser radiation used for lap-welding the heating wire segment to the conductor leads, i.e., low in comparison with the reflectance of the conductor leads 82, 84, as further described below.

The conductor leads 82, 84 comprise a metal having a relatively high electrical conductivity (i.e., relatively low resistance) in comparison with the metal of the heating wire segment 70. The cross-sectional area of each of the conductor leads advantageously is greater than that of the heating wire segment. As a result of the differences in materials and cross-sectional areas between the heating wire segment and the conductor leads, the heating wire segment has a higher electrical resistance than the conductor leads. Accordingly, when a given electrical current is passed through the heating element 34, the heating wire segment 70 is heated to a higher temperature than that of the conductor leads 82, 84. The heating wire segment can be raised to the sealing temperature of the film plies by suitably regulating the current; at the same time, the conductor leads remain below the sealing temperature. The heating element is mounted such that the heating wire segment 70 is in contact with the support cylinder 18 along the predetermined arc 62 as previously described. Therefore, the film plies 14a, b are heated by the heating wire segment 70 to seal the plies together.

The conductor leads 82, 84 can comprise various metals having appropriately low electrical resistance. Non-limiting examples of suitable metals are copper in substantially pure form, or copper alloyed with one or more other materials such as silver, nickel, etc. For example, the metal can comprise copper alloyed with about 2% by weight nickel. This is in contrast with the heating element disclosed in U.S. Pat. No. 6,550,229, previously referred to, wherein the conductor leads comprise stainless steel. The electrical resistance of stainless steel is many times that of the copper alloy. When stainless steel is used for the conductor leads, the linear advance rate of the film plies through the sealing device cannot be increased above a certain limit (the specific value of which depends on various factors such as the composition and thickness of the film plies, the pressure exerted on the film plies by the heating element, etc.) because when the electrical current is increased sufficiently to heat the heating wire segment 70 to the sealing temperature, the conductor leads become unacceptably hot. This can lead to problems such as ribbon cutting of the film plies by the conductor leads, and/or mechanical failure of the conductor leads caused by overheating.

In accordance with one embodiment of the invention, the conductor leads can comprise Nickel Alloy 30 copper resistance wire available from California Fine Wire, Inc. of Grover Beach, Calif. This resistance wire comprises 98% copper and 2% nickel by weight. It has a specific resistance of 30 $\Omega$-cm/° F. and a specific resistivity of 4.99 $\mu\Omega$-cm, a tensile strength at break of 207 MPa in the annealed condition and 414 MPa in the hard drawn condition, and a melting point of 1100° C. The heating wire segment can comprise nichrome (an alloy of about 80% nickel and about 20% chrome), which has a specific resistivity of about 110 to 150 $\mu\Omega$-cm. Thus, the nichrome has a resistivity many times higher than that of the Nickel Alloy 30. In general, the resistivity of the metal forming the heating wire segment can be at least about 10 times that of the metal forming the conductor leads, more preferably at least about 15 times, and still more preferably at least about 20 times.

The use of copper or copper alloy, or the like, for the conductor leads 82, 84 solves the above-noted problems and permits higher film advance rates because the electrical resistance of such material is a fraction of that of stainless steel. Accordingly, increased electrical current can be passed through the heating element to heat the heating wire segment 70 to the sealing temperature at the higher film advance rate, while the conductor leads 82, 84 remain well below the sealing temperature because of their significantly reduced electrical resistance.

However, copper or copper alloy materials have a substantially higher reflectance to the laser radiation used for welding the heating wire segment 70 to the conductor leads 82, 84, relative to the reflectance of the heating wire segment. For example, pure copper has a reflectance of about 98.5% at a wavelength of 1064 nm (the wavelength of a neodymium YAG laser, which is particularly suitable for carrying out the welding). The Nickel Alloy 30 material contains 2% nickel, which at 1064 nm has a reflectance of approximately 48%, which would be expected to reduce the reflectance of the alloy to approximately 97% to 98%. In contrast, the reflectance of a resistance heater material such as nichrome is substantially lower. In particular, although published figures on the reflectance of nichrome at 1064 nm wavelength were not available at the time of filing the present application, it was determined that nickel has a reflectance of approximately 60% and chromium has a reflectance of roughly 80%. Accordingly, it would be expected for the reflectance of nichrome to be less than 80% (e.g., about 65% to 70%). In general, the reflectance of the metal forming the heating wire segment can be less than about 90%, more preferably less than about 85%, still more preferably less than about 80%, and most preferably less than about 75%. The reflectance of the metal forming the conductor leads can be greater than 95%.

Thus, the reflectance of the heating wire segment is substantially lower than that of the conductor leads. As a result, it becomes difficult to laser weld the heating wire segment to the conductor leads using the butt weld technique disclosed in the above-referenced '229 patent. The laser radiation does not heat the conductor leads nearly as efficiently as it heats the heating wire segment because much of the laser radiation is reflected off the conductor leads. Although measures can be taken to reduce the reflectance of the conductor leads (e.g., using brazing paste or the like), this is not a fully satisfactory solution to the problem.

In accordance with one embodiment of the invention, this problem is addressed by lap-welding the heating wire segment 70 to the conductor leads 82, 84. Thus, the first end 72 of the heating wire segment is overlapped with the end of the first conductor lead 82 to form a lap joint, and the lap joint is exposed to laser radiation to weld the components together. Likewise, the second end 74 of the heating wire segment is overlapped with the end of the second conductor lead 84 and the components are laser-welded together.

To further facilitate the formation of acceptable welds, the end of each conductor lead 82, 84 is deformed as shown in FIG. 6, which shows first conductor lead 82, it being understood that second conductor lead 84 has a substantially similar configuration. More particularly, the conductor lead 82 initially can be provided as a round wire. An end portion of the lead 82 is flattened and dimpled (assuming a generally "kidney" shape) to form a concave recess 92 in the outer surface of the lead. The recess 92 extends lengthwise along the lead 82 for at least a distance corresponding to the desired length of the lap joint with the heating wire segment. The appropriate length of the lap joint will generally depend on various factors such as the diameters of the heating wire segment 70 and conductor lead 82, the properties of the respective materials, etc.

The first end 72 of the heating wire segment is cradled in the recess 92 of the conductor lead 82 to form the desired lap joint, and laser radiation from a YAG laser having a wavelength of 1064 nm is focused on the lap joint. The material of the heating wire segment may melt before that of the conductor lead, but the recess 92 contains the molten material until the material of the conductor lead also melts. The molten material absorbs the laser radiation more readily than does the solid state of the material. The molten materials flow together and the laser radiation is terminated to allow the materials to cool and solidify to form a weld between the heating wire segment and the conductor lead. The process is repeated for the other conductor lead.

After the heating wire segment 70 is lap-welded to the conductor leads 82, 84, the heating wire segment and conductor leads can be flattened, if desired, such that the thickness (as shown in FIG. 3) is less than the width (as shown in FIG. 4) for each component. The flattened heating element can engage the support cylinder 18 such that the thickness of the heating element extends in the radial direction of the cylinder and the width of the heating element extends in the axial direction of the cylinder. In such case, the groove in the cylinder that receives the heating element is appropriately configured for accommodating the flattened heating element.

With particular reference to FIGS. 3 and 4, in one embodiment of the invention, the opposite end of the first conductor lead 82 from the lap-welded end is connected to a tension spring 100. The tension spring can include loops 102, 104 at its opposite ends to facilitate attachment of the spring. The loops 102, 104 advantageously lie in respective planes that are orthogonal to each other, although such is not a necessity. The opposite end of the second conductor lead 84 from the lap-welded end is connected to a mounting lug 106 configured to be mounted to a suitable support (not shown). For example, as shown, the mounting lug 106 can include a hole for receiving a fastener such as a screw in order to fasten the mounting lug to the support. The attachment of the mounting lug 106 also effects a coupling of one end of the heating element to an electrical current source (not shown).

When the opposite ends of the heating element 34 are mounted to a suitable support, the spring 100 maintains a desired tension in the heating element. The heating element 34 in one embodiment includes a shunt wire 108 having one end connected to the spring loop 102 that is connected to the first conductor lead 82. An opposite end of the shunt wire 108 is connected to a mounting lug 110 having a hole therethrough. A fastener such as a screw (not shown) is passed through the hole of the mounting lug 110 and through the spring loop 104 and is fastened to a suitable support (not shown), thereby securing the respective end of the heating element 34 to the support and establishing an electrical pathway through the shunt wire 108, bypassing the spring 100. The attachment of the mounting lug 110 also effects a coupling of the other end of the heating element to the electrical current source. The majority of the electrical current flowing through the heating element passes through the shunt wire rather than through the spring. This helps keep the temperature of the spring low enough to avoid high-temperature-induced problems that could arise in the spring. For example, if the spring were raised high enough in temperature, the spring constant could decline because of a temperature-induced change in material properties. The shunt wire avoids such problems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A heating element for a film-sealing apparatus, comprising:
    a heating wire segment having opposite first and second ends, the heating wire segment being formed of a first metal having a first reflectance to laser radiation of a predetermined wavelength, the heating wire segment having a first electrical resistance;
    a first conductor lead comprising a wire having one end joined to the first end of the heating wire segment and an opposite end for connection to an electrical current supply;
    a second conductor lead comprising a wire having one end joined to the second end of the heating wire segment and an opposite end for connection to the electrical current supply;
    the first and second conductor leads each having an electrical resistance lower than the first electrical resistance of the heating wire segment such that a predetermined electrical current passed through the heating element causes the heating wire segment to be heated to a sealing temperature at which film plies placed in contact with the heating wire segment are heat-sealed together while the conductor leads remain below the sealing temperature; and
    the first and second conductor leads each being formed of a second metal having a second reflectance to laser radiation of said predetermined wavelength, the second reflectance being higher than the first reflectance, each of the first and second conductor leads being lap-welded to the respective end of the heating wire segment using laser radiation of said predetermined wavelength.

2. The heating element of claim 1, wherein the first metal comprises a nickel-chromium alloy and the second metal comprises copper.

3. The heating element of claim 2, wherein the second metal comprises a copper-nickel alloy.

4. The heating element of claim 3, wherein the copper-nickel alloy comprises about 98% copper and about 2% nickel by weight.

5. The heating element of claim 1, wherein one of the first and second conductor leads is connected to a tension spring for exerting a tension force on the heating element during use.

6. The heating element of claim 5, further comprising a shunt wire connected from one end of the tension spring to an opposite end of the tension spring such that some of the electrical current flowing through the heating element passes through the shunt wire, bypassing the tension spring.

7. The heating element of claim 1, wherein the one end of each of the first and second conductor leads is deformed to form a concave recess in an outer surface of the conductor lead, the concave recess extending lengthwise along the conductor lead for a distance corresponding to an overlap between the heating wire segment and the respective conductor lead, and wherein the first and second ends of the heating wire segment are cradled in the concave recesses of the respective first and second conductor leads and laser-welded to join the conductor leads to the heating wire segment.

8. The heating element of claim 1, wherein a mounting lug is joined to the opposite end of one of the first and second conductor leads for mounting one end of the heating element to a support and for establishing an electrical connection with an electrical current supply.

9. The heating element of claim 1, wherein the first metal has a reflectance to the laser radiation that is less than 80% and the second metal has a reflectance to the laser radiation that is greater than 95%.

10. A method for making a heating element for a film-sealing apparatus, the method comprising the steps of:
   providing a heating wire segment formed of a first metal having a first reflectance to laser radiation of a predetermined wavelength, the heating wire segment having a first electrical resistance and having opposite first and second ends;
   providing first and second conductor leads each formed of a second metal having a second reflectance to laser radiation of said predetermined wavelength, the second reflectance being higher than the first reflectance, each of the conductor leads having an electrical resistance lower than the first electrical resistance of the heating wire segment; and
   lap-welding one end of the first conductor lead to the first end of the heating wire segment, and lap-welding one end of the second conductor lead to the second end of the heating wire segment, using laser radiation of said predetermined wavelength.

11. The method of claim 10, wherein the first metal comprises a nickel-chromium alloy and the second metal comprises copper.

12. The method of claim 11, wherein the second metal comprises a copper-nickel alloy.

13. The method of claim 10, further comprising connecting a tension spring to one of the first and second conductor leads for exerting a tension force on the heating element during use.

14. The method of claim 13, further comprising the steps of:
   connecting one end of a shunt wire to one end of the tension spring; and
   connecting an opposite end of the shunt wire to an opposite end of the tension spring, such that in use, some of the electrical current flowing through the heating element passes through the shunt wire, bypassing the tension spring.

15. The method of claim 10, further comprising the steps of:
   deforming the one end of each of the first and second conductor leads to form a concave recess in an outer surface of the conductor lead, the concave recess extending lengthwise along the conductor lead;
   cradling the first and second ends of the heating wire segment in the concave recesses of the respective first and second conductor leads to form a lap joint between the heating wire segment and each of the conductor leads; and
   focusing the laser radiation on each of the lap joints to weld the first and second conductor leads to the heating wire segment.

16. The method of claim 15, wherein each of the conductor leads is initially provided as a circular wire, and the deforming step comprises deforming the one end of each of the first and second conductor leads to have a generally kidney-shaped cross-section.

17. The method of claim 10, wherein after the lap-welding steps, portions of the heating element are deformed to have a generally flattened cross-section.

18. The method of claim 10, further comprising the step of joining a mounting lug to the opposite end of one of the first and second conductor leads for mounting one end of the heating element to a support and for establishing an electrical connection with an electrical current supply.

19. The method of claim 10, wherein the first metal is provided to have a reflectance to the laser radiation that is less than 80% and the second metal is provided to have a reflectance to the laser radiation that is greater than 95%.

* * * * *